Feb. 9, 1937.  A. C. HOECKER  2,070,050
BUMPER CARRIED LIFTING JACK FOR AUTOMOBILES
Filed June 17, 1929
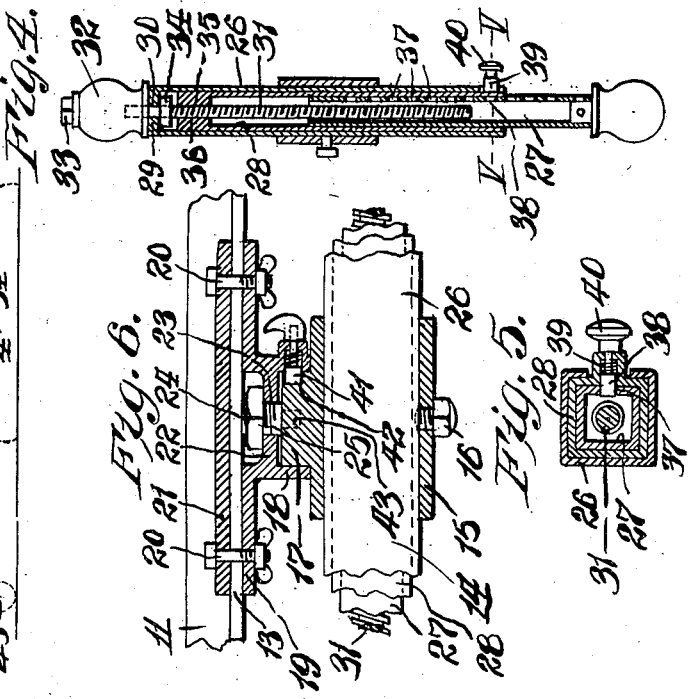
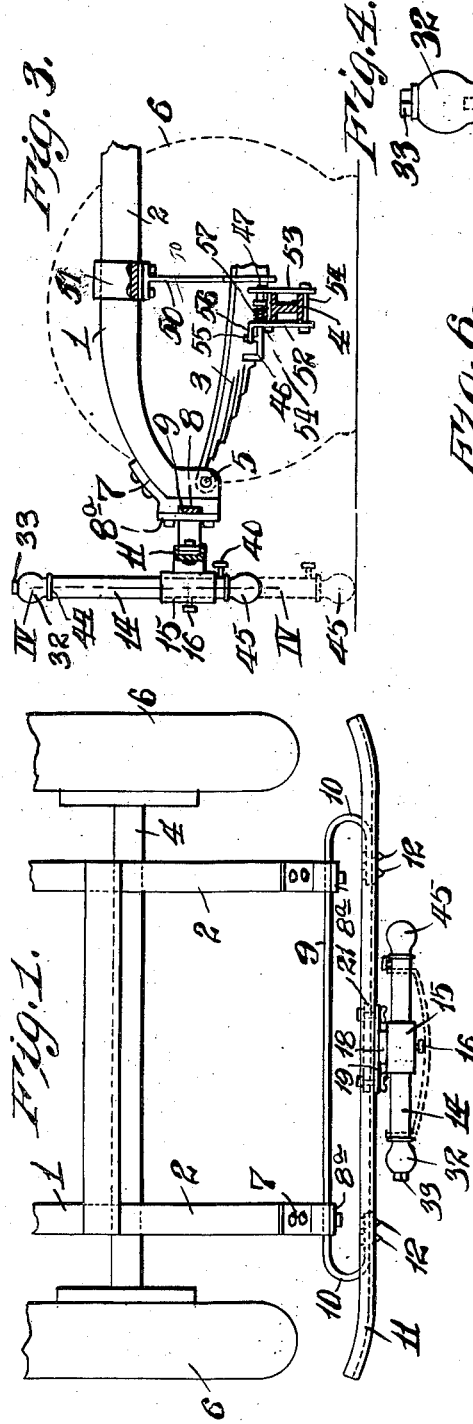
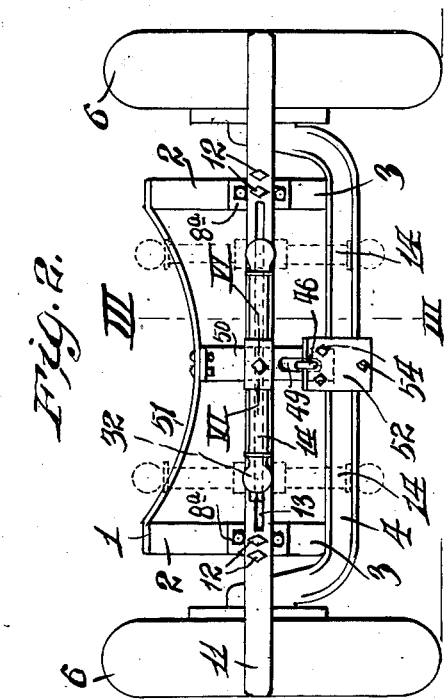
Inventor:
Albert C. Hoecker.
By Herbert G. Fletcher
Atty.

Patented Feb. 9, 1937

2,070,050

UNITED STATES PATENT OFFICE 2,070,050

BUMPER CARRIED LIFTING JACK FOR AUTOMOBILES

Albert C. Hoecker, St. Louis, Mo.

Application June 17, 1929, Serial No. 371,543

19 Claims. (Cl. 293—55)

This invention relates to certain new and useful improvements in a bumper carried lifting jack for automobiles, and is a furthering of the subject matter presented in my Patent No. 1,717,686 granted June 18, 1929, on Jack and bumper for automobiles.

The primary object of the invention is to provide the bumpers of automobiles with a lifting jack which is carried by the bumper and which can be disposed to different positions on the bumper.

A further object of the invention is in providing a bumper carried jack with improved means whereby the jack can be slidably connected to the bumper.

Another object of the invention is in providing a bumper carried jack with improved means for slidably and swingingly securing the jack to the bumper.

A still further object of the invention is in providing a bumper with a lifting jack with improved means for lowering the jack to an engaging position with the roadway.

Another still further object of the invention is in providing an automobile with a bumper carried jack and with improved means for locking the axle of the automobile to the frame when the lifting operation of the jack is being carried on.

Other and further objects will appear in the specification and be specifically pointed out in the appended claims, reference being had to the accompanying drawing, exemplifying the invention, and in which:—

Figure 1 is a fragmentary plan view of the front portion of an automobile frame showing this improved bumper carried lifting jack supported from the frame.

Figure 2 is a front elevation of Fig. 1.

Figure 3 is a fragmentary longitudinal vertical section taken approximately on the line III—III of Fig. 2.

Figure 4 is an enlarged vertical section taken approximately on the line IV—IV of Fig. 3 but showing the jack in a lowered position ready for the lifting operation.

Figure 5 is an enlarged horizontal section taken through the jack approximately on the line V—V of Fig. 4.

Figure 6 is an enlarged fragmentary horizontal section taken through the jack approximately on the line VI—VI of Fig. 2.

Referring to the drawing 1 designates the chassis of a vehicle having the side frames 2, said chassis being supported on the springs 3 which are mounted on the axle 4, each spring being secured at one end to the forward end of a respective side frame 2 by a bolt 5. The axle is provided with the usual ground engaging wheels 6.

The disclosure of this improved bumper carried lifting jack is shown as applied to the forward end of an automobile vehicle, although the application thereof can be made to the rear of the vehicle as well as in some instances automobiles carry the approximate same type of bumpers in the rear as in the front particularly since the advent of carrying the spare tires sidewise of the automobile.

Secured to the forward end of each side frame 2 is a bracket 7 having a seat 8 formed therein and which seats are in horizontal alinement when the brackets are mounted on respective side frames, each seat 8 being for the reception of a transversely disposed supporting member 9 having bent ends 10, said member being secured in seating position by the plates 8a, each end 10 being secured to a bumper rail 11 by the bolts 12. The bumper rail 11 is shown as being of a channel shape and is provided with a longitudinally extending slot 13, said slot in said bumper rail providing for the support of the lifting jack 14 thereon.

The lifting jack 14 is supported in a tubular shaped head 15 and is held in said head by the set screw 16, said head 15 having an intermediately disposed extension 17 which is turnably mounted in a bearing 18 which is extended from a bracket 19, said bracket being held against the front of the bumper rail 11 by the clamping screws 20 which are passed through the slot 13 of the bumper rail from the base plate 21 which is mounted in the channel of the bumper rail.

The bearing 18 of the bracket 19 is provided with an end wall 22 having a centrally disposed opening 23 and mounted in said opening is a pin 24 which is extended from and forms part of the extension 17 of the head 15, said pin at its extended end being threaded and provided with a nut 25, said nut being located in a counterbore or recess which is formed in the bracket 19 adjacent the wall 22 of said bracket. The bracket 19 and the head 15 thereby provide a support for the lifting jack 14 on the bumper rail 11 of the vehicle or automobile.

The lifting jack 14 is made of a plurality of telescoping members comprising an outer tubular member 26, an inner tubular member 27 and an intermediately disposed tubular member 28, said tubular members in this instance of disclosure being square shaped. The outerly disposed tubular member 26 is closed at one end as designated at 29 and formed in said closed end is an opening 30 for the reception of one end of a screw or threaded shaft 31 and secured to the extending end of said shaft outwardly of the wall 29 of the member 26 is a finishing knob 32 having a polygonal shaped lug 33 for the reception of a wrench.

A collar 34 is fixedly secured to the shaft 31 in engagement with the end 29 of the outer tubular member 26, the threads of said shaft being engaged in a threaded opening 35 which is formed in the end 36 of the intermediately disposed tubular member 28 next adjacent the end 29 of the tubular member 26, said shaft extending into the inner tubular member 27 but being free from engagement therewith as shown in Fig. 4. One side of the inner tubular member 27 is provided with a plurality of spaced apertures 37 and for cooperation with said apertures is a spring actuated plunger 38 which is mounted in a cylinder 39, said cylinder being supported transversely from the intermediately disposed tubular member 28 at its end opposite to the end wall 36 thereof, the plunger also being provided with a hand engaging portion 40. The outer tubular member 26 is notched at one end for the reception of the cylinder 39 of the plunger 38.

This improved bumper carried lifting jack 14 is turnably secured to the bracket 19 so that it can be carried either in a horizontal position as shown in Figs. 1 and 2 or in a vertical position as shown in Fig. 3, as when the jack is carried in the vertical position, the jack will provide a protector or guard for the front of the vehicle and the radiator thereof, and will also prevent over or under riding of the bumper with the bumpers of other vehicles.

When it is desired to swing the jack from a horizontal position to a vertical position, the spring pressed plunger 41 which is carried on the outside of the bearing 18 of the bracket 19 is pulled from engagement with the recess 42 formed in the extension 17 of the head 15, and the jack is turned so that the knob 32 carrying the lug 33 is disposed upwardly and when the jack has been moved to the vertical position, the plunger 41 will engage in the recess 43 which is formed on the underside of the extension 17, the plunger holding the jack in its vertical position. If it is desired to locate the jack in its highest vertically extended position, the set screw 16 is manipulated and the jack 14 is forced upwardly in the head 15 and is held in its raised position by the tightening of the set screw 16.

When it is required to use the lifting jack for changing a tire, the clamping screws 20 are released so that the jack can be slid along the bumper rail 11 to either the left or right position shown by dotted lines in Fig. 2, and the jack can be swung to an operating position of lifting by releasing the plunger 41; that is providing the jack has been carried in a horizontal position as shown in Figs. 1 and 2.

If the jack is being carried by the vehicle in the position shown in Fig. 3 and it is desired to use the jack for lifting, the set screw 16 is released and the jack 14 is permitted to fall through the vertically disposed head 15 and in which the shoulder 44 of the knob 32 will engage the upper edge of the head 15. In this dropped or lowered position it will be found that the finishing knob 45 which is secured to one end of the inner tubular member 27 will be adjacent or possibly touching the surface of the roadway, and an operating tool is then engaged on the polygonal lug 33 of the knob 32. Upon turning the tool or wrench in a right hand direction the left hand screw thread formed on the shaft 31 by its engagement with the threaded opening 35 in the end 36 of the intermediate tubular member 28, will force said tubular member outwardly from the lower end of the tubular member 26 and as the inner tubular member bearing the knob 45 is secured to the intermediate member 28, the forcing of the member 28 will elevate the outer member 26 thereby causing the chassis 1 to be elevated. Before the lifting operation on the jack is commenced, a spring actuated locking bolt 46 is released and the locking end 47 of the bolt will enter a vertically extending slot 49 which is formed in a plate 50 which depends from a cross member 51 of the chassis 1 rearwardly of the axle 4, the engaging of the bolt 46 with the plate 50 tying the axle to the chassis so that the springs of the chassis will not be spread.

The locking bolt 46 is mounted above the axle 4 and is supported in a pair of plates 52 and 53, one of which is secured to each side of the axle, said plates being held in position by bolts 54, and extending angularly from the locking bolt 46 is a retaining pin 55 which is adapted to engage in a notch or recess in the lip 56 formed on the upper end of the plate 52. On engaging the bolt for permitting the spring 57 to become active thereon, the bolt is slightly pulled and turned so as to release the pin 55 from engagement with the lip 56 and the locking end 47 of the bolt will engage the slot 49 of the tie plate 50. For releasing the bolt from the tie plate, the bolt is withdrawn against the spring pressure and then turned so that the pin 55 will again engage the lip 56.

From the disclosure of this improved bumper carried lifting jack, it is obvious that a single jack can be used at either end of the vehicle and can be quickly located to positions for elevating a wheel from either side of a longitudinal center of the vehicle for removing and replacing tires and in addition the jack when being vertically held will serve as a protector guard at either end of the vehicle.

What I claim is:—

1. A bumper for a vehicle having a transversely disposed rail of the approximate length of the vehicle width paralleling an axle of the vehicle, and a jack slidably mounted on said rail for locating it in lifting position to either side of the longitudinal center of the vehicle, said jack having a part to be lowered for adjusting the jack to a position of lifting operation.

2. A bumper for a vehicle comprising a transversely disposed rail having a slot therein, said rail being connected adjacent its ends to respective sides of the vehicle, a member slidably connected in the slot of said rail for longitudinal positioning thereon, and an operating element carried by said member adapted to be projected therefrom for elevating a part of the vehicle from positions determined by the location of said member on said rail.

3. In a vehicle, the combination of a frame, a lifting jack supported by the ends of said frame, said jack comprising a plurality of telescoping members, one of said members being connected to the frame, another said member being slidably connected in the first said member, a screw cooperable with said second member for forcing it outwardly from said first mentioned member, and a third member slidably mounted in said second member, the cooperation of said pair of last mentioned members with one another providing for the jack to be quickly adjusted to a lifting position.

4. A slidably held vehicle carried jack for lifting a part of a vehicle comprising a plurality of telescoping members, one of which is movable within the other, a screw cooperable with said movable member, and another member slidably related to said movable member, and means for holding said slidable member in either extended or collapsed positions.

5. In a vehicle, a frame, an axle, springs between the axle and frame, a lifting jack connected to the frame, a latch carried by said axle, and a part carried by the frame which is cooperable with said latch for preventing spreading of the frame from the axle when the jack is in lifting position.

6. In a vehicle, a frame, an axle, springs between the axles and frame, a latch carried by said axle, and a part depending from the frame for cooperation with said latch for preventing spreading of the frame from the axle.

7. In a vehicle, a frame, a lifting jack supported from said frame, said jack comprising a pair of polygonal-shaped telescoping members, a lifting screw cooperable with said members, and an adjustably slidable lengthening element mounted in the inner member cooperable with said members adapted to be vertically dropped therefrom.

8. A lifting device for a vehicle comprising a stationarily held horizontal bar having a slot therein, said bar being of the approximate length of the vehicle width and disposed parallel to an axle thereof, and a jack slidably connected to said bar by the slot.

9. In a vehicle, a frame, an axle, springs between the axle and frame, a transverse rail immovably fixed to one end of said frame, a lifting jack carried by said rail, and means carried by the axle for cooperation with means connected with the frame, for preventing spreading of the axle and frame when the jack is in lifting position.

10. In a vehicle the combination of a frame, a rail secured adjacent its ends to opposite sides of the frame, and a jack slidably mounted on said rail for lifting a part of the vehicle, said jack adapted to lie parallel with the rail when in a normal position and to be swung and held at an angle to said rail when in a lifting position.

11. A lifting jack for a vehicle comprising a member secured to the vehicle, a cooperable second member, forcing means cooperable with said second member for lifting said vehicle, and a third member cooperable to primarily adjust the jack to a lifting position.

12. A bumper for a vehicle having a horizontally held rail, and a lifting jack slidably and swingably mounted on said rail so that a single jack can be utilized for lifting different parts of said vehicle.

13. A lifting device adapted to be mounted on an automobile, said lifting device comprising a horizontal rail, a lifting jack slidably and swingably mounted on said rail to positions for lifting different parts of the automobile, and means for locking said jack in either a horizontal or a vertical position.

14. A lifting device for a vehicle comprising a horizontal rail of a length whereby either of a pair of wheels of the vehicle can be elevated by lifting respective ends thereof, a jack for lifting cooperation with said rail on either side of the intermediate part thereof, and interlocking means cooperable to prevent relative displacement of the rail and the jack during lifting operation of the jack on the rail.

15. A lifting device for a vehicle comprising a frame and bumper structure, said structure having a member with a slot for the reception of a part of a lifting jack, said slot and jack part adapted to prevent said jack from falling over when said jack is in a lifting position.

16. In a vehicle having an axle and frame, a member extending from said frame a distance from said axle, said member having a part slidably engageable with a part of a lifting jack to form a joint between said jack and said member, said jack adapted to be connected to different parts of said vehicle so that a single jack can be utilized to lift different parts of said vehicle.

17. In a vehicle having a frame and body structure, said frame having a member with a socket adjacent said body for the reception of a part of a lifting jack, said jack adapted to be shifted to different positions on said vehicle so that a single jack can be utilized for lifting different parts of said vehicle.

18. A vehicle having a frame and bumper structure, said structure having a member clamped thereto with means for the reception of a shank of a lifting jack, said jack adapted to be shifted to different positions on said structure so that a single jack can be utilized for lifting different parts of said vehicle.

19. The combination with the frame of a vehicle and the axle beneath the same, and a spring yieldably connecting the frame and axle together, of a coupling device comprising means connected to the frame co-operable with the axle to lock the frame and axle together to enable the axle to be lifted with the frame, means connected with the frame and extending a distance from the axle and a jack provided with supporting means to receive and hold upon said second mentioned means to prevent said jack from falling over when said vehicle is being lifted, said jack adapted to be shifted to different positions so that a single jack can be utilized for lifting different parts of said vehicle.

ALBERT C. HOECKER.